United States Patent Office 3,737,294
Patented June 5, 1973

3,737,294
METHOD FOR MAKING MULTI-LAYER LAMINATED BODIES
William H. Dumbaugh, Jr., Painted Post, James E. Flannery and John E. Megles, Corning, and John A. Smith, Big Flats, N.Y., assignors to Corning Glass Works, Corning, N.Y.
No Drawing. Filed Aug. 28, 1970, Ser. No. 68,055
Int. Cl. C03b 5/26; C03c 3/22
U.S. Cl. 65—33     13 Claims

ABSTRACT OF THE DISCLOSURE

This invention relates to high strength glass, glass-ceramic, or glass and glass-ceramic laminated articles which are produced through a continuous hot-forming process wherein glass batches are melted for the individual laminae and these laminae are essentially simultaneously fused together and shaped into a laminated structure of a desired configuration. Where a glass-ceramic lamina is sought, the initially-formed laminated glass article is subsequently heat treated in a particularly-defined manner to cause the glass to crystallize in situ. The present invention is specifically concerned with viscosity relationships obtained in the melts utilized in forming the individual laminae.

BACKGROUND OF THE INVENTION

United States application Ser. No. 735,074, filed June 6, 1968 now abandoned and assigned to the same assignee as the instant application, discloses the production of glass and/or glass-ceramic articles consisting of a tensilely-stressed core portion and a compressively-stressed adhered layer substantially enveloping the core portion. The adhered layer is under compression because in a laminated product containing a glass layer the coefficient of thermal expansion of the adhered layer is at least $15 \times 10^{-7}/^\circ$ C. less than that of the core portion at the setting point of the system. Whereas the application discloses the utility of the invention in the manufacture of all types of product forms, e.g., cane, tubing, bulbs, etc., the bulk of the description describes the production of three-ply laminated sheet, i.e., a core portion of one composition with a skin portion of a different composition. In general, the coefficient of thermal expansion of the outer layer ranges between about $30-40 \times 10^{-7}/^\circ$ C. and that of the core portion between about $60-110 \times 10^{-7}/^\circ$ C.

United States application Ser. No. 735,115, filed June 6, 1968 now Pat. Ser. No. 3,597,305 issued Aug. 3, 1971 and also assigned to the same assignee as the instant application, discloses the production of multi-ply glass and/or glass-ceramic articles wherein the surface layers are under compressive stress, there is at least one inner layer which is also under compressive stress, and each layer of the laminated article exhibits a state of stress opposite to that of the layers adjacent thereto. The observed compressive stress in a laminated product containing a glass layer is the result of the coefficient of thermal expansion of the adjacent layers being at least $15 \times 10^{-7}/^\circ$ C. more than the compressively stressed layers at the setting point of the system.

Each of these applications makes reference to the considerable amount of work undertaken by various other researchers in the field of laminated glass and/or glass-ceramic structures. Thus, the overlaying of bodies with low expansion glasses, e.g., glazing, the chemical strengthening of articles through ion exchange reactions, and the uniting of glass laminae through contact therebetween while each is somewhat soft are discussed. And it was acknowledged therein that the various prior art methods had contemplated the utility of employing compressively-stressed surface layers to improve the overall mechanical strength of the composite body.

However, each of these applications points out that the prior art did not teach a method for making a hot-laminated glass and/or glass-ceramic article through a continuous process. The formation of the laminated structure at elevated temperatures secures intimate bonding, i.e., fusion, of the various laminae such that the interface surface between the laminae, being completely fused, is pristine or defect-free. Hence, the glasses forming the individual layers are relatively fluid at the time of contact therebetween such that any surface defect will be healed in the laminating step. And, therefore, full advantage of the developed compressive stresses can be enjoyed, particularly in the multi-ply laminated structure described above wherein cracks or other defects originating the surface layer are prevented from propagating through the entire cross section of the article. The interface between the various laminae will not provide sources of breakage.

In delineating the parameters of the hot-forming process, each of those applications emphasized the need to maintain the relationship between the viscosities of adjacent layers within certain specifications of limits. Hence, for example, in a three-ply composite article, the viscosity of the core portion must be greater than the viscosity of the skin portions and may be as much as 6 times greater at the laminating temperature. In a multi-ply laminated body, the viscosity at the laminating temperature of the innermost lamina must be 1–6 times greater than the outermost layer and those layers intermediate the innermost and outermost layers. Normally, the viscosities of the plies between the innermost and outermost plies will be equivalent to or between the viscosities of the innermost and outermost plies. As is explained in those applications, the innermost lamina should have a viscosity at least as high and, preferably higher than the other laminae to provide support for the composite during the forming step.

SUMMARY OF THE INVENTION

We have discovered that sound, strong, laminated glass and/or glass-ceramic articles can be hot-formed in general accordance with the method outlined in the two aforementioned applications, but wherein the viscosity of the core or inner layer is less than the viscosity of the skin layers or those laminae intermediate the skin and core layers at the laminating temperature. Thus, the most fundamental body produced by our invention is that described in Ser. No. 735,074, supra now abandoned, although multi-ply bodies such as are described in Ser. No. 735,115, supra now Pat. No. 3,597,305 issued Aug. 3, 1971, can also be produced. Hence, all of the shapes and configurations capable of being manufactured in accordance with Ser. Nos. 735,074 and 735,115, for example, sheets, rods, spheres, tubing etc., can likewise be formed through our invention. And, like the products described in those applications, the laminated articles of this invention, being formed at high temperatures wherein the glasses comprising the laminae are fluid, are defect-free at the laminae interfaces. Therefore, the interfaces will not impart sources of weakness to the final product.

We have found that not only can laminated articles composed of various numbers of plies be successfully produced utilizing skin or outer layers of glass having greater viscosities than the core or inner layers, but the products formed thereby have improved skin quality. Thus, in the formation of the composite articles by the method described in Ser. Nos. 735,074 and 735,115, very fine wrinkles were frequently observed in the surface of the final products, which were characterized as an "orange peel" effect. This orange peel effect was believed due to the fact that when the body glass contracted, the skin glass was moved ever so slightly such that fine wrinkles appeared in the surface thereof. However, where the skin or outer layers of glass have a higher viscosity at the laminating temperature than the core or inner layers, this phenomenon does not occur and a smooth, essentially defect-free surface can be obtained.

In summary, we have learned that laminated articles can be successfully fabricated wherein the glass comprising the skin or outer layers exhibits a viscosity at the laminating temperature which is greater than, but no more than about six times greater than, that of the core or inner layers at the laminating temperature. Any intermediate layer will desirably demonstrate a viscosity equivalent to or between that of the core portion and outer layer. Although the actual forming of the laminated products of our invention requires somewhat more care to assure uniformity and integrity of shape since the core or inner layers are less viscous than the skin or outer portions, the general forming techniques described in the Ser. Nos. 735,074 and 735,115, supra, as well as the glass and glass-ceramic compositions discussed therein, can be utilized in the present invention.

Likewise, in order that the laminate be appreciably strengthened and the proper stress distribution secured, the coefficient of thermal expansion of the compressively stressed layers must be at least $5 \times 10^{-7}/°$ C. less than that of the adjacent tensilely stressed layers at the setting point of the softest of the compressively stressed and adjacent layers where the laminated article is composed of glass-eramic laminae. Where the layers are composed of glass, this difference in coefficient of thermal expansion should be at least $15 \times 10^{-7}/°$ C. Also, in the instance of the three-ply laminated article, the ratio of core thickness to the total skin thickness, i.e., the total of the core and two skin layer thicknesses when viewed in cross section, will generally range between about 10:1 to 30:1. Where a multi-ply laminated article is desired, the ratio of the thickness of the core layer to the thickness of each other lamina will commonly range about 10:1 to 400:1 and the ratio of the total thickness of all tensilely stressed layers to the total thickness of all compressively stressed layers will normally range about 5:1 to 50:1.

DESCRIPTION OF THE PREFERRED EMBODIMENT

We have determined that the three-ply and multi-ply laminated articles produced in accordance with the instant exhibit physical properties and structural characteristics essentially identical to the products disclosed in Ser. Nos. 735,074 and 735,115, supra, other than the above-described improvement in surface quality. For example, very high compressive stresses may be introduced into outer plies while the magnitude of the counterbalancing internal tension remains relatively low. Hence, in a three-ply laminated body, the ratio of maximum compression to maximum tension will commonly vary from about 5:1 to 20:1 and in a multi-ply article this ratio will normally vary between about 5:1 to 50:1. When these ratios are compared to that generally attending a thermally tempered article, viz., about 2:1, it can readily be seen that much greater maximum surface compression for the same maximum tension may be achieved in a laminated body than in a thermally tempered article. Therefore, inasmuch as violence of breakage is related to the total strain energy in the body, the violence of breakage is lower in the laminated article than in the tempered body, since the maximum tensile stress is lower in the laminated article than in the tempered body. Finally, the maximum stresses developed within the laminated article are related to the ratio of the thicknesses of the core portion to the adhered plies and not to absolute thickness. This, of course, is in contrast to the situation obtaining in a thermally tempered body wherein the stresses are directly related to the actual thickness of the article in addition to the thickness ratio.

In general, the flexural strength of the laminated article, as measured in terms of modulus of rupture, ranges between about 15,000 to 50,000 p.s.i. With modulus of rupture values much above 50,000 p.s.i., violence of breakage upon fracture can become severe. Such strengths are attained by controlling the difference between the coefficients of expansion between adjacent plies ("expansion mismatch") and by controlling the thickness of the respective plies.

One important factor in obtaining the stress in a laminated article is the amount of strain therein. The strain is initiated at the lowest setting point of each ply and the laminae adjacent thereto. The setting point of a glass has been defined as a temperature 5° C. above the strain point thereof. The stress in the body can be calculated employing, inter alia, the strain. Hence, rather than actually measuring strain, a reasonable approximation thereof lies in the difference between the coefficients of thermal expansion, as measured from 0°–300° C., multiplied by the differential from the lowest setting point to the use temperature. In other words, there must be some minimum difference in the coefficients of thermal expansion at the setting point. In a glass or glass and glass-ceramic laminated body, the coefficient of thermal expansion of a compressively stressed lamina ought to be at least $15 \times 10^{-7}/°$ C. less than that of the adjacent tensilely stressed plies. However, where glass-ceramic laminae constitute the entire product, wherein by the nature of the materials the lowest setting point is several hundred degrees higher than glass, an expansion mismatch of only $5 \times 10^{-7}/°$ C. between the compressively stressed ply and the adjacent tensilely stressed plies will be sufficient to impart significantly enhanced strength to the body.

These differences in coefficients of thermal expansion are interrelated with the thickness of the various laminae. In our preferred practice, the coefficients of thermal expansion of the core portion or inner plies will range between about $50-100 \times 10^{-7}/°$ C. and the coefficient of thermal expansion of the skin or outer plies will vary between about $30-80 \times 10^{-7}/°$ C. Normally, the expansion mismatch between the adjacent laminae will range between about $15-70 \times 10^{-7}/°$ C.

A further important factor affecting the stress within a laminated body is the ratio of the total thickness of the tensilely stressed laminae to the total thickness of the compressively stressed layers. Thus, in the three-ply articles, the thickness ratio ought to range between about 10:1 to 30:1 with 15:1 being preferred. At ratios less than about 10:1, the violence of breakage becomes very severe. At ratios greater than about 30:1, the skin plies become relatively thin with the concomitant result that surface defects imposed thereon in normal handling and shipping may penetrate therethrough. Of course, in massive bodies, this danger would not be present.

Where multi-ply articles are being formed, the ratio of the total thickness of the tensilely stressed laminae to the total thickness of the compressively stressed layers can satisfactorily vary between about 5:1–50:1. Hence, because of the multi-ply character of the final product, violence of breakage does not usually become a serious problem until ratios less than about 5:1 are utilized.

And, because of the subsurface fortification which the several internal laminae bring to the article, the overall thickness of the compressively stressed layers can be quite low.

The laminated articles of this invention can be used in many applications. For example, thin strong tableware is possible as is the production of vehicle windshields. In both of these applications, one of the primary advantages of this laminating system can be enjoyed, i.e., the ratios of strength-to-weight and strength-to-body cross section are high. The multiply embodiments of these two types of products have an extra beneficial feature.

Thus, in vehicle windshields one of the principal sources of breakage has been the impact of stones being thrown up from the roadway by other vehicles. When using the multi-ply laminated windshield, such a stone may fracture the outermost compressively stressed ply and the crack then propagate through the adjacent tensilely stressed layer. However, it would not penetrate through the next adjacent compressively stressed fortification lamina and thereby the integrity of the windshield would be maintained. Tableware having this type of laminated structure would behave similarly when subjected to impact.

The laminated articles of this invention are fabricated through a hot-forming process wherein separate sources of molten glasses are brought together in the fluid state and combined in a manner such that separate laminae of desired thickness and composition are molded together in a predetermined relationship. For example, in forming laminated sheet, separate sources of molten glass are brought together in such a manner that each source provides a stream of molten glass of the required thickness and composition. These individual streams are then fused together along the longitudinal plane thereof and the thus-fabricated laminated sheet thereafter further formed or cut into a desired shape. The interior layers will frequently be exposed along the cut edge during the cutting step. This exposure is normally not wanted since a source of weakness is provided. Nevertheless, approximately designed cutters have been developed to minimize this exposure.

Inasmuch as the fabrication of the laminated articles of this invention contemplates a hot-forming process, the viscosities of the various glasses at the moment of lamination must demonstrate a particular relationship to each other. Hence, in Ser. Nos. 735,074 and 735,115, discussed above, it was disclosed that at the laminating temperature the tensilely stressed core ply should exhibit a viscosity of 1 to 6 times that of the compressively stressed outer or skin layer with the preferred viscosity ratio varying between about 2:1 to 4:1. The viscosities of the laminae intermediate the core and skin plies would then exhibit values equivalent to or between the viscosities of the core and skin layers.

The desirability for the core lamina to demonstrate a higher viscosity than the skin layer was bottomed upon ease of forming the laminated structure. Thus, the more viscous core portion would act to support the skin portions. Nevertheless, this practice resulted in the above-described "orange peel" surface defects in the products. We have discovered that this detrimental surface effect can be eliminated where the viscosity of the skin glass is higher than that of the core glass at the laminating temperature. Hence, we have found that laminated articles can be satisfactorily formed with essentially no evidence of surface wrinkling where the viscosity of the compressively stressed skin layer is higher than that of the tensilely stressed core portion and up to six times higher, the preferred viscosity ratio being greater than 1:1 and up to about 4:1. Therefore, it will be recognized that our invention contemplates the converse of the disclosures of Ser. Nos. 735,074 and 735,115. During the progress of the laminating process, the core, skin, and intermediate plies will normally be maintained at the same temperature while retaining the desired viscosity ratio. Nevertheless, it can be appreciated that the various individual glasses can be brought to the laminating operation at different temperatures so long as the viscosities thereof are within the necessary ratio. The viscosities of the plies intermediate the core and skin layers will exhibit values equivalent to or between those layers.

The selection of the absolute viscosities is dependent upon the manner of forming and the product to be fabricated. For example, in the production of tableware through sagging of hot laminated sheets into molds, trimming the excess, and then removing from the mold, viscosities of less than 5000 poises are advantageous, whereas in tube or cane drawing processes viscosities between about 50,000–200,000 poises may be required, and in an updraw process for glass sheet a viscosity of 1000,000–250,000 poises may be necessary.

The liquidus temperatures of the individual plies must be lower than the lamination temperatures to preclude devitrification occurring in the laminating step. In general, the laminating operation will be carried out at temperatures ranging between about 1200°–1350° C. with the preferred temperature approximating 1275° C.

It is sometimes necessary to subsequently heat treat the laminated articles fabricated from the aforementioned hot-forming process, e.g., to cause a heat-treatable opal glass to strike-in or to cause a thermally crystallizable glass to crystallize in situ to a glass-ceramic. In order to heat treat the body without formers or other supports and yet maintain the shapes thereof, the viscosity of the skin plies at the heat treating temperatures (maximum about 850° C.) is desirably greater than that of the inner laminae. In this way, the higher viscosity outer layers tend to retain the more fluid inner plies, Therefore, the skin glasses of this invention will exhibit higher viscosities than the tensilely stressed inner layers both at the lamnating temperature and at the heat treating temperature. In general, the compressively stressed skin plies will have an annealing point of at least 600° C. to preclude deformation thereof during the heat treatment step with the preferred embodiment demanding an annealing point not lower than 700° C. Of course, if there is to be no subsequent heat treatment, the annealing point of the skin layers can be below 600° C. and the viscosity thereof need not exceed that of the core portion at normal heat treating temperatures.

The transparent, opacifiable, or thermally crystallizable glasses which are operable in this invention have been disclosed in copending application Ser. No. 735,074 and Ser. No. 735,115, supra, and compositions of such glasses have been reported therein. Various combinations of these glasses can be combined to yield laminated products having certain desired properties.

Thus, clear laminae can be produced from three general glass composition ranges:

(1) Calcium aluminosilicate glasses consisting essentially, by weight on the oxide basis, of:

(a) 50–65% $SiO_2$;
(b) 10–20% $Al_2O_3$;
(c) 5–25% CaO;
(d) 0–12% MgO;
(e) 0–10% $B_2O_3$;
(f) 0–12% total of BaO, SrO, ZnO, and $La_2O_3$; anu
(g) 0–5% total of $Li_2O$, $Na_2O$, $K_2O$, $TiO_2$, and $ZrO_2$ (2) Barium aluminosilicate glasses consisting essentially, by weight on the oxide basis, of:

(a) 40–60% $SiO_2$;
(b) 5–15% $Al_2O_3$;
(c) 20–50% BaO;
(d) 0–25% SrO; and
(e) 0–10% total of $La_2O_3$, $B_2O_3$, CaO, MgO, $TiO_2$, $ZrO_2$, PbO, ZnO, CdO, and $P_2O_5$ (3) Alkali aluminosilicate glasses consisting essentially, by weight on the oxide basis, of:
(a) 50–75% $SiO_2$;
(b) 10–30% $Al_2O_3$;
(c) 5–25% total alkali metal oxide wherein $Na_2O$ constitutes at least one-half of the total and $K_2O$ comprises 0–6%;
(d) 0–20% total alkaline earth metal oxide;
(e) 0–10% total of $La_2O_3$, $TiO_2$, $ZrO_2$, $Nb_2O_5$, ZnO, CdO, $GeO_2$, PbO, $Bi_2O_3$, $CeO_2$, and $B_2O_3$;
(f) 0–2% total of $As_2O_3$ and $Sb_2O_3$;
(g) 0–1.5% Cl; and
(h) 0–5% total of $Cr_2O_3$, $MnO_2$, $Fe_2O_3$, CuO, CoO, $Nd_2O_5$, $V_2O_5$, and NiO.

Spontaneous opal glass laminae can be formed from compositions consisting essentially, by weight on the oxide basis, of:

(a) 50–75% $SiO_2$;
(b) 3–20% $Al_2O_3$;
(c) 3–20% total alkali metal oxide wherein $Na_2O$ constitutes at least one-third of the total and $K_2O$ comprises 0–8%;
(d) 0–20% total alkaline earth metal oxide;
(e) 0–10% total of $La_2O_3$, $TiO_2$, $ZrO_2$, $Nb_2O_5$, ZnO, CdO, $GeO_2$, PbO, $Bi_2O_3$, $CeO_2$, and $B_2O_3$;
(f) 0–2% total of $As_2O_3$ and $Sb_2O_3$;
(g) 0–1.5% Cl;
(h) 0–5% total of $Cr_2O_3$, $MnO_2$, $Fe_2O_3$, CoO, CuO, $Nd_2O_5$, $V_2O_5$, and NiO; and
(i) 2–8% F.

Heat treatable opal glass laminae can be produced from compositions consisting essentially, by weight on the oxide basis, of:

(a) 50–70% $SiO_2$;
(b) 15–25% $Al_2O_3$;
(c) 7–14% $Na_2O$;
(d) 5–12% ZnO;
(e) 2.5–7% F; and
(f) 0–3% total of $As_2O_3$, CaO, MgO, $B_2O_3$, $Li_2O$, and BaO.

Zinc orthosilicate-nucleated, nepheline-type glass-ceramic laminae can be formed by heat treating thermally crystallizable glass compositions consisting essentially, by weight on the oxide basis, of:

(a) 44–61% $SiO_2$;
(b) 19–23% $Al_2O_3$;
(c) 10–14% $Na_2O$;
(d) 7–10% ZnO;
(e) 3–6% F; and
(f) 0–3% total of $As_2O_3$, CaO, MgO, $B_2O_3$, $Li_2O$, and BaO.

Titania-nucleated, nepheline-type glass-ceramic laminae can be produced by heat treating thermally crystallizable glass compositions consisting essentially, by weight on the oxide basis, of:

(a) 50–65% $SiO_2$;
(b) 20–30% $Al_2O_3$;
(c) 15–20% total of $Na_2O$ and CaO consisting of 9–20% $Na_2O$ and 0–9% CaO;
(d) 0.25–3% MgO;
(e) 3–6% $TiO_2$; and
(f) 0–5% total of CdO, ZnO, $As_2O_3$, $K_2O$, and $B_2O_3$.

The following examples are illustrative of the manner in which the laminated products of our invention can be formed.

Example I

Two separate streams of glass for transparent skin layers of the following composition, in weight percent on the oxide basis, were formed: 64.1% $SiO_2$, 16.1% $Al_2O_3$, 17.6% CaO, and 2.2% $B_2O_3$. A transparent core glass of the following composition, also reported in weight percent on the oxide basis, was melted: 57.5% $SiO_2$, 20.0% $Al_2O_3$, 13.0% $Na_2O$, 4.3% $K_2O$, 3.2% CaO, and 2.0% MgO. The two streams of skin glass and the stream of core glass were fused together at a temperature of about 1300° C. to form a clear three-ply laminated sheet wherein the core glass was the center ply. At that temperature the viscosity of the core glass was about 4500 poises and that of the skin layers about 5250 poises, thereby yielding a skin-to-core viscosity ratio of about 1.2:1. The liquidus temperature of the skin glass was about 1196° C. whereas that of the core glass was about 1058° C.

The hot laminated sheet was sagged into a custard cup-shaped mold, trimmed, removed from the mold, and allowed to cool. The thus-formed custard cup had a rim diameter of 4½", a bottom diameter of 3", and a height of 1⅜". The core glass lamina was about 0.080" thick and each skin layer was about 0.002" in cross section, resulting in an overall thickness ratio between the core and skin layers of about 20:1. The annealing point of the core glass was 633° C. and that of the skin glass was 764° C. The coefficient of thermal expansion of the core glass (0°–300° C.) was about $92.1 \times 10^{-7}/°$ C., whereas that of the skin layers was about $46.2 \times 10^{-7}/°$ C. This combination of thickness ratios and expansion mismatch provided a composite body exhibiting a modulus of rupture of about 45,000 p.s.i. The custard cup demonstrated the ability to withstand impacts up to 0.6 foot pound. Minimum impact strengths of 0.3 foot pound have been determined empirically to be desirable for tableware articles.

To secure a qualitative measurement of the violence of breakage attending of the cup, a test utilizing a center punch was employed. In this test a center punch was placed in the middle of the cup bottom and then struck with increasing force until the cup breaks. The average breakage of five cups fractured in that manner involved five to ten pieces with very little violence.

Example II

Glass for transparent skin layers of the following composition, in weight percent on the oxide basis, was melted: 58.7% $SiO_2$, 18.1% $Al_2O_3$, 4.5% $B_2O_3$, 11.7% CaO, and 7.0% MgO. A stream of glass for a transparent body portion of the following composition, in weight percent on the oxide basis, was formed: 58.5% $SiO_2$, 15.5% $Al_2O_3$, 8.5% $Na_2O$, 4.0% $K_2O$, 6.5% MgO, and 7.0% CaO. Two streams of skin glass and one stream of body glass were then fused into a transparent three-ply laminated sheet at 1300° C., the body glass constituting the center ply. At that temperature the viscosity of the core glass was about 700 poises and that of the skin plies about 1200 poises, resulting in a skin-to-body viscosity of about 1.7:1. The liquidus temperature of the skin glass was about 1166° C. and that of the body portion was about 1167° C.

The hot laminated sheet was sagged into a custard cup-shaped mold as set out in Example I. The annealing point of the body glass was 638° C. and that of the skin glass was 724° C. The coefficients of thermal expansion of the body glass (0°–300° C.) was about $82.3 \times 10^{-7}/°$ C., whereas that of the skin plies was about $44.1 \times 10^{-7}/°$ C. This combination of thickness ratios and expansion mismatch yielded a body exhibiting a modulus of rupture of about 38,000 p.s.i. with an impact strength of about 0.45 foot pound. When subjected to the center punch test described above, the cups broke into about 10 pieces with very little violence.

Example III

Glass for clear skin layers of the following composition, in weight percent on the oxide basis, was melted: 62.2% $SiO_2$, 14.5% $Al_2O_3$, and 23.3% CaO. A transparent body glass of the following composition, also reported in weight percent on the oxide basis, was melted: 48.1% $SiO_2$, 6.3% $Al_2O_3$, 41.6% BaO, and 3.8% SrO. Two streams of the skin glass and one stream of body glass were fused together into a clear three-ply laminated sheet at a temperature of about 1300° C. with the body glass comprising the center ply. At 1300° C. the viscosity of the skin glass was about 1400 poises and the viscosity of the body glass was about 1300 poises, thereby yielding a skin-to-body viscosity ratio of about 1.1:1. The liquidus temperature of the skin glass was about 1139° C. and that of the body glass about 1188° C.

The hot laminated sheet was sagged into a custard cup-shaped mold as described in Example I. The coefficient of thermal expansion of the body glass (0°–300° C.) was about $73.3 \times 10^{-7}/°$ C., whereas that of the skin plies was about $54.5 \times 10^{-7}/°$ C. The annealing point of the body glass was 706° C. and that of the skin glass was 772° C. This combination of thickness ratios and expansion mismatch produced a composite sheet demonstrating a modulus of rupture of about 24,000 p.s.i. with an impact strength of about 0.3 foot pound. Upon breakage in the center punch test, the cups broke into no more than about ten pieces with low violence.

Example IV

Glass was melted for transparent skin layers of the following composition, in weight percent on the oxide basis: 58.3% $SiO_2$, 14.8% $Al_2O_3$, 14.9% CaO, 6.3% $B_2O_3$, and 5.7% MgO. A spontaneous opal body glass was melted of the following composition, in weight percent on the oxide basis: 64.86% $SiO_2$, 6.22% $Al_2O_3$, 15.2% CaO, 3.36% $Na_2O$, 3.21% $K_2O$, 4.70% $B_2O_3$, 0.75% MgO, and 3.24% F. The skin glass and body glass were fused together at a temperature of about 1300° C. to form three-ply laminated sheet having the body glass as the center ply. At that temperature the viscosity of the body glass was about 650 poises and that of the skin portion about 680 poises, resulting in a skin-to-body viscosity ratio of about 1.05:1. The liquidus temperature of the skin glass was about 1089° C. and the opal liquidus of the body glass was about 1150° C.

The hot laminated sheet was sagged into a custard cup-shaped mold as set out in Example I, the spontaneous opal body glass striking in as the shape cooled. The annealing point of the body glass was 605° C. and that of the skin glass was 706° C. The coefficient of thermal expansion of the body glass (0°–300° C.) was about $71.6 \times 10^{-7}/°$ C. and that of the skin glass (0°–300° C.) was about $47.7 \times 10^{-7}/°$ C. This combination of thickness ratios and expansion mismatch produced an article exhibiting a modulus of rupture of about 30,000 p.s.i. and an impact strength of about 0.35 foot pound. The cups fractured into no more than about 10 pieces with very little violence when broken in the center punch test described above.

Example V

Glass having the following composition, in weight percent on the oxide basis, of 64.2% $SiO_2$, 11.7% $Rl_2O_3$, 7.7% CaO, 3.0% $Na_2O$, 1.5% $K_2O$, 1.4% $B_2O_3$, 1.7% MgO, and 8.7% ZnO was melted for clear skin glass and a spontaneous opal glass having the following composition, in weight percent on the oxide basis, of 64.21% $SiO_2$, 6.29% $Al_2O_3$, 14.97% CaO, 2.12% $Na_2O$, 3.98% $K_2O$, 4.62% $B_2O_3$, 0.69% MgO, and 3.12% F was melted for a core glass. Streams of skin and core glass were fused together into a three-ply composite body at about 1300° C. wherein the core glass comprised the center ply. At 1300° C. the viscosity of the core glass was about 700 poises whereas that of the skin glass was about 3500 poises, thereby yielding a skin-to-core viscosity ratio of about 5:1. The liquidus temperature of the skin glass was about 1094° C. and the opal liquidus of the core glass was about 1245° C.

The hot laminated sheet was sagged into a custard cup-shaped mold as set out in Example I, the spontaneous opal core portion striking in as the cup cooled. The annealing point of the core glass was 631° C. and that of the skin glass was 672° C. The coefficient of thermal expansion of the core glass (0°–300° C.) was about $70.7 \times 10^{-7}/°$ C. and that of the skin glass (0°–300° C.) was about $47.7 \times 10^{-7}/°$ C. This combination of thickness ratios and expansion mismatch resulted in a product demonstrating a modulus of rupture of about 28,000 p.s.i. and an impact strength of 0.3 foot pound. When broken in the center punch test described above, no more than ten pieces resulted with very low violence of breakage.

Example VI

Glass was melted for a transparent skin glass having the following composition, in weight percent on the oxide basis: 58.7% $SiO_2$, 18.0% $Al_2O_3$, 11.7% CaO, 4.5% $B_2O_3$, and 7.1% MgO. The same spontaneous opal body glass was melted as that recited in Example V. Streams of these glasses were fused together at a temperature of about 1300° C.to compose a three-ply laminated sheet having the body glass as the middle ply. At that temperature the viscosity of the body glass was again about 700 poises while that of the skin glass was about 1200 poises, thereby producing a skin-to-body viscosity ratio of about 1.7:1. The liquidus temperature of the skin glass was about 1166° C. and the opal liquidus of the body glass was about 1245° C.

The hot laminated sheet was sagged into a custard cup-shaped mold as reported in Example I, the spontaneous opal body portion striking in as the cup cooled. The annealing point of the body glass was 631° C. and that of the skin glass was 724° C. The coefficient of thermal expansion of the body glass (0°–300° C.) was about $70.7 \times 10^{-7}/°$ C. and that of the skin glass (0°–300° C.) was about $44.1 \times 10^{-7}/°$ C. This combination of thickness ratios and expansion mismatch yielded a product exhibiting a modulus of rupture of about 30,000 p.s.i. and an impact strength of 0.35 foot pound. No more than ten pieces were observed after subjection to the above-described center punch test with very low violence of breakage.

Example VII

The same skin glass as that recorded in Example VI was melted. A spontaneous opal body glass was melted having the following composition, in weight percent on the oxide basis: 67.2% $SiO_2$, 6.2% $Al_2O_3$, 15.3% CaO, 1.3% $B_2O_3$, 4.3% $Na_2O$, 1.5% $K_2O$, and 4.3% F. Streams of these glasses were fused together at about 1300° C. to form a three-ply composite laminant wherein the body glass constituted the center ply. At 1300° C. the viscosity of the body glass was about 650 poises whereas that of the skin glass was again 1200 poises, resulting in a skin-to-body viscosity ratio of about 2:1. The liquidus temperature of the skin glass was about 1166° C. and the opal liquidus of the body glass was about 1250° C.

The hot laminated sheet was sagged into a custard cup-shaped mold as explained in Example I, the spontaneous opal body glass striking in as the body cooled. The annealing point of the body glass was 667° C. and that of the skin glass was 724° C. The coefficient of thermal expansion of the body glass (0°–300° C.) was about $73.3 \times 10^{-7}/°$ C. while that of the skin glass was again about $44.1 \times 10^{-7}/°$ C. This combination of thickness ratios and expansion mismatch yielded a three-ply laminated sheet exhibiting a modulus of rupture of about 31,000 p.s.i. with an impact strength of about 0.37 foot pound. When subjected to the center punch test discussed above, the cups broke into no more than ten pieces with very low violence of breakage.

Example VIII

Glass for transparent skin layers were melted of the following composition, in weight percent on the oxide basis: 59.7% $SiO_2$, 14.9% $Al_1O_2$, 14.5% CaO, 4.4% $B_2O_3$, and 6.5% MgO. The same spontaneous opal core glass recited in Example IV was melted. Streams of these glasses were fused together at about 1300° C. to develop a three-ply laminated sheet wherein the opal glass comprised the center ply. At that temperature the viscosity of the core glass was about 650 poises and the viscosity of the skin glass was about 740 poises, resulting in a skin-to-core viscosity of about 1.1:1. The liquidus temperature of the skin glass was about 1176° C. whereas the opal liquidus of the core glass was about 1150° C.

The hot laminated sheet was sagged into a custard cup-shaped mold in the manner referred to in Example I, the spontaneous opal glass striking in as the body cooled. The annealing point of the core glass was 605° C. and that of the skin glass was 713° C. The coefficient of thermal expansion of the core glass (0°–300° C.) was about $71.6 \times 10^{-7}/°$ C. and that of the skin glass (0°–300° C.) was about $46.9 \times 10^{-7}/°$ C. This combination of thickness ratios and expansion mismatch produced a three-ply laminated body demonstrating a modulus of rupture of about 30,000 p.s.i. and an impact strength of about 0.35 foot pound. Fewer than ten pieces resulted from the above-described center punch test with very low violence of breakage.

Example IX

A thermally-crystallizable body glass having the following composition was melted: 53.3% $SiO_2$, 21.0% $Al_2O_3$, 13.2% $Na_2O$, 8.7% ZnO, and 3.8% F. Glass for transparent skin layers having the following composition was melted: 60.6% $SiO_2$, 14.3% $Al_2O_3$, 13.9% CaO, 4.9% $Na_2O$, and 6.3% ZnO. Streams of these glasses were fused together at a temperature of about 1300° C. to provide a three-ply laminated sheet wherein the thermally-crystallizable glass constituted the middle portion. At 1300° C., the viscosity of the body glass was about 750 poises and the viscosity of the skin glass was about 1200 poises, resulting in a skin-to-body viscosity ratio of about 1.6:1. The liquidus temperature of the skin glass was about 1140° C. and that of the core glass was 1197° C.

A custard cup was then formed from the hot laminated sheet as described in the previous examples wherein the thickness of the body glass was 0.090" and the total thickness of the two skin plies was 0.006", yielding a body-to-skin thickness ratio of about 15:1. At this point the cup was clear with the skin plies demonstrating a coefficient of thermal expansion (0°–300° C.) of about $48 \times 10^{-7}/°$ C. and an annealing point of 686° C. The body portion thereof, having an annealing point of 549° C., was crystallized in situ by subjecting the cup to the following heat treatment: raised at 300° C./hour to 660° C.; raised at 30° C./hour to 750° C. and held thereat for one hour; cooled to room temperature. This heat treatment converted the body glass to a highly crystalline, zinc orthosilicate-nucleated, nepheline-type glass-ceramic having a coefficient of thermal expansion (0°–300° C.) of about $80 \times 10^{-7}/°$ C. This particular combination of thickness ratio and expansion mismatch yielded a body exhibiting a modulus of rupture of about 40,000 p.s.i. and an impact strength of about 0.45 foot pound. Upon subjection to the center punch test described above, the cups broke into about 10–50 pieces with low violence of breakage.

Example X

A thermally crystallizable core glass was melted having the following composition, in weight percent on the oxide basis: 58.92% $SiO_2$, 15.69% $Al_2O_3$, 10.18% $Na_2O$, 8.59% ZnO, 4.67% F, and 1.94% CaO. A glass for transparent skin layers was also melted having the following composition: 62.3% $SiO_2$, 14.5% $Al_2O_3$, and 23.2% CaO. Streams of these glasses were fused together at a temperature of about 1300° C. to form a three-component laminated sheet wherein the thermally-crystallizable glass comprised the center lamina. At that temperature the viscosity of the core glass was about 1300 poises and that of the skin glass was about 1400 poises, yielding a skin-to-core viscosity ratio of about 1.08:1. The liquids temperature of the skin glass was about 1076° C. and that of the core glass was about 1139° C.

A custard cup was formed from the hot laminated sheet having the same dimensions as those recited in Example IX. The cup was transparent with the skin glass exhibiting a coefficient of thermal expansion (0°–300° C.) of about $54 \times 10^{-7}/°$ C. and an annealing point of 772° C. The core portion of the cup, having an annealing point of 546° C., was thereafter crystallized in situ by exposing it to the following heat treatment: raised at 400° C./hour to 660° C.; raised at 100° C./hour to 720° C., and held thereat for one hour; cooled to room temperature. By this heat treatment the core glass was transformed into a highly crystalline, zinc orthosilicate-nucleated, nepheline-type glass-ceramic article having a coefficient of thermal expansion (0°–300° C.) of about $70 \times 10^{-7}/°$ C. This particular combination of thickness ratios and expansion mismatch produced a composite body demonstrating a modulus or rupture of about 30,200 p.s.i. with an impact strength of about 0.32 foot pound. The cups broke into no more than about 50 pieces with low violence of breakage when fractured in the center punch test.

Example XI

A thermally crystallizable core glass of the following composition, in weight percent on the oxide basis, was melted: 52.43% $SiO_2$, 25.42% $Al_2O_3$, 10.00% $Na_2O$, 7.47% CaO, 0.94% MgO, and 3.74% $TiO_2$. For a skin glass the following composition, in weight percent on the oxide basis, was melted: 63.4% $SiO_2$, 15.9%% $Al_2O_3$, 11.3% CaO, 2.2% $B_2O_3$, 6.3% ZnO, and 0.9% $Li_2O$. Streams of these glasses were fused together at a temperature of about 1300° C. to provide a three-ply laminated sheet wherein the thermally-crystallizable glass constituted the middle lamina. At 1300° C. the viscosity of the core glass was about 2000 poises whereas that of the skin glass was about 2800 poises, resulting in a skin-to-core viscosity ratio of about 1.4:1. The liquids temperature of the skin glass was about 1160° C. and that of the core glass about 1245° C.

A custard cup was formed from the hot laminated sheet having the same dimensions as those reported in Example IX. The cup was then clear with the skin glass exhibiting a coefficient of thermal expansion (0°–300° C.) of about $41.4 \times 10^{-7}/°$ C. and an annealing point of 682° C. The core portion of the cup, having an annealing point of 703° C., was then crystallized in situ through the following heat treatment schedule: raised at 300° C./hour to 740° C. and maintained thereat for one-half hour; raised at 30° C./hour to 850° C. and held thereat for one hour; cooled to room temperature. That heat treatment converted the core glass to a highly crystalline, titania-nucleated, nepheline-type glass-ceramic having a coefficient of thermal expansion (0°–300° C.) of about $95 \times 10^{-7}/°$ C. The composite body exhibited a modulus of rupture of about 60,000 p.s.i. and an impact strength of 0.8 foot pound. The center punch test resulted in the cups being broken into no more than 50 pieces with relatively low violence of breakage.

The bulk of the above description and each of the previous working examples have related to laminated articles wherein all the laminae were either all glass or combinations of glasses and glass-ceramics. Nevertheless, three-ply and multi-ply laminated composite articles consisting of all glass-ceramic laminae can be prepared in accordance with the method of this invention. Hence, streams of thermally crystallizable glasses are fused together to give a defect-free interface therebetween. Shapes are fashioned from the laminant and the glass plies thereof are crystallizd in situ through a particular time-temperature schedule. The forming parameters such as viscosity ratios, liquid temperatures, etc., which must be observed are the same as those utilized in the other systems. The heat treatment parameters are also similar to those recited above with respect to mixed glass and glass-ceramic laminated articles but the maximum heat treatment temperature can be above 850° C.

Furthermore, the thickness ratios and expansion mismatches found suitable in glass-containing laminated articles are also applicable to all glass-ceramic laminated bodies. As has been explained above, with respect to the glass-containing laminates, the mechanical strength thereof is related to the strain which could be approximated by the expansion mismatch at the setting point of the softest glass in the laminant. However, this setting point of the softest glass-ceramic is normally several hundred degrees greater than that of a glass. Therefore, the expansion mismatch at the setting temperature can be less even though the strain is the same inasmuch as the setting point-to-use-temperature differential is greater for an all-glass-ceramic laminant than for a glass-containing laminant. Nevertheless, in all-glass-ceramic laminant the expansion mismatch will normally be at least $15 \times 10^{-7}/°C$., the same as that for a glass-containing laminant. However, useful glass-ceramic laminants can be produced where the expansion mismatch is as low as $5 \times 10^{-7}/°C$. Finally, very satisfactory glass-ceramic laminants can be prepared wherein the laminae have very low or very high coefficients of thermal expansion. In sum, then, glass-ceramic laminants can have coefficients of thermal expansion outside of the range found suitable for glass-containing laminated products.

We claim:

1. A method for continuously hot-forming a strong laminated glass article composed of a plurality of fused adjacent layers wherein:
   (1) each layer exhibits a state of stress opposite to that of each layer adjacent thereto;
   (2) the outermost layer is in a state of compression; and
   (3) the coefficient of thermal expansion of a compressively-stressed layer is at least about $15 \times 10^{-7}/°C$. less than the coefficient of thermal expansion of an adjacent tensilely-stressed layer at the setting point;
   which comprises the steps of:
   (a) melting a glass forming batch for each layer;
   (b) essentially simultaneously bringing said molten batches together while in the fluid state and combining them into a laminated glass article at an elevated temperature such that each tensilely-stressed layer has a viscosity less than and up to six times less than each compressively-stressed layer; and
   (c) fusing said layers together such that an interface therebetween is essentially defect-free.

2. A method according to claim 1 wherein the viscosity of said innermost lamina is less than and up to four times less than the viscosity of said outermost lamina and the viscosity of any laminae intermediate said innermost and outermost laminae.

3. A method according to claim 1 wherein said plurality of fused adjacent laminae are selected from the group consisting of clear glass, spontaneous opal glass, heat treatable opal glass, and thermally crystallizable glass.

4. A method according to claim 1 wherein the temperature for combining the melts together ranges between about 1200°–1350° C.

5. A method according to claim 1 wherein said laminated article consists of three laminae, the ratio of the thickness of said innermost layer to said outermost layer ranging between about 10:1–30:1.

6. A method according to claim 1 wherein said laminated article consists of more than three laminae, the ratio of the total thickness of the tensilely stressed laminae to the total thickness of the compressively stressed laminae ranging between about 5:1–50:1.

7. A method according to claim 6 wherein the ratio of the thickness of said innermost lamina to the thickness of each compressively stressed lamina ranges between about 10:1 to 400:1.

8. A method according to claim 1 wherein the coefficient of thermal expansion of the tensilely stressed laminae ranges between about $50-100 \times 10^{-7}/°C$. and the coefficient of thermal expansion of the compressively stressed lamina ranges between about $30-80 \times 10^{-7}/°C$.

9. A method according to claim 3 wherein each lamina of said article consists of a clear glass.

10. A method according to claim 3 wherein said article contains at least one lamina of a spontaneous opal glass.

11. A method according to claim 3 wherein said article contains at least one lamina of a heat treatable opal glass which is heat treated at a temperature below about 850° C. to cause said lamina to opalize.

12. A method according to claim 3 wherein said article contains at least one lamina of a thermally crystallizable glass which is heat treated at a temperature below about 850° C. to crystallize said lamina in situ to a glass-ceramic article.

13. A method according to claim 3 wherein each lamina of said article consists of thermally crystallizable glass which is heat treated at a temperatures less than or greater than about 850° C. to crystallize each lamina in situ to a glass-ceramic article.

References Cited

UNITED STATES PATENTS

| | | | |
|---|---|---|---|
| 1,563,854 | 12/1925 | O'Shauganessy | 65—60 X |
| 1,734,965 | 11/1929 | Danner | 65—60 X |
| 1,960,121 | 5/1934 | Moulton | 65—60 X |
| 2,305,683 | 12/1942 | Engels | 65—30 X |
| 2,337,691 | 12/1943 | Stettinius et al. | 65—33 X |
| 2,779,136 | 1/1957 | Hood et al. | 65—33 X |
| 3,063,198 | 11/1962 | Babcock | 65—33 X |
| 3,113,878 | 12/1963 | Martin | 65—33 X |
| 3,291,586 | 12/1966 | Chapman, Jr. et al. | 65—33 |
| 3,088,835 | 5/1963 | Pirooz | 65—33 X |

FRANK W. MIGA, Primary Examiner

U.S. Cl. X.R.

65—121, 60, 30